US012802419B2

(12) United States Patent
Ohno

(10) Patent No.: US 12,802,419 B2
(45) Date of Patent: Nov. 17, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yoshiki Ohno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 18/830,755

(22) Filed: Sep. 11, 2024

(65) Prior Publication Data

US 2025/0095343 A1 Mar. 20, 2025

(30) Foreign Application Priority Data

Sep. 19, 2023 (JP) ................................ 2023-151542

(51) Int. Cl.

| | |
|---|---|
| ***G06V 10/778*** | (2022.01) |
| ***G06V 10/26*** | (2022.01) |
| ***G06V 10/774*** | (2022.01) |
| ***G06V 10/776*** | (2022.01) |
| ***G06V 10/82*** | (2022.01) |

(52) U.S. Cl.

CPC ............ *G06V 10/778* (2022.01); *G06V 10/26* (2022.01); *G06V 10/774* (2022.01); *G06V 10/776* (2022.01); *G06V 10/82* (2022.01)

(58) Field of Classification Search

CPC ...... G06V 10/778; G06V 10/82; G06V 10/26; G06V 10/774; G06V 10/776

See application file for complete search history.

(56) References Cited

U.S. PATENT DOCUMENTS

| | | | | |
|---|---|---|---|---|
| 2021/0089807 A1* | 3/2021 | Liu | ........................ | G06V 20/70 |
| 2021/0334975 A1* | 10/2021 | Yang | ...................... | G06N 3/084 |
| 2023/0222669 A1* | 7/2023 | Zhao | ........................ | G06T 7/12 382/155 |
| 2024/0256901 A1 | 8/2024 | Ohno | | |

FOREIGN PATENT DOCUMENTS

JP 6872502 B2 5/2021

OTHER PUBLICATIONS

Yin, H. et al., "Improved semantic segmentation method using edge features for winter wheat spatial distribution extraction from Gaofen-2 images" Journal of Applied Remote Sensing (May 2021) pp. 028501-1-028501-19, vol. 15, No. 2.

* cited by examiner

*Primary Examiner* — David Perlman

(74) *Attorney, Agent, or Firm* — Carter, DeLuca & Farrell LLP

(57) ABSTRACT

An image processing apparatus comprises a calculation unit configured to perform an error calculation to obtain an error between a calculation result of a learning model to which a learning image is input and a teacher image corresponding to the learning image, and a learning unit configured to perform learning of the learning model based on the error. The calculation unit performs the error calculation by making an error corresponding to a boundary region of an object in the teacher image larger than other regions.

8 Claims, 8 Drawing Sheets

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a learning technique of a learning model.

Description of the Related Art

There is a technology in which a machine such as a computer learns and recognizes contents of data such as an image and sound. Here, the purpose of the recognition process is referred to as a recognition task, and a mathematical model for learning and executing the recognition task is referred to as a recognition model.

The recognition task includes, for example, an object detection task for detecting a specific object (face, pupil, head, animal, vehicle, etc.) from an image. In addition, the recognition task includes a region detection task that performs object detection in units of pixels of an image, which is called semantic regional division. In addition, there are various recognition tasks such as an object category recognition task of distinguishing a category (human, animal, vehicle, etc.) of an object (subject) in an image, a tracking task of searching for and tracking a specific subject, and a scene type recognition task of distinguishing a type (cities, mountains, coasts, etc.) of a scene. Hereinafter, the recognition task may be referred to as a task.

A neural network is known as a technique for learning and executing such a task. In particular, a deep (large number of layers) multilayer neural network is also referred to as a deep neural network (DNN). DNN is an abbreviation for Deep Neural Network. In particular, a deep convolutional neural network is referred to as a deep convolutional neural network (DCNN). DCNN stands for Deep Convolutional Neural Network. DCNN has attracted attention in recent years for its high performance (recognition accuracy and recognition performance).

For example, in a human skin region detection task that is a task of detecting a skin region of a human in an image, there is a case where detection performance of a boundary region between skin and non-skin such as a contour of an eye or a mouth or a hairline is not improved. This is because the proportion the region corresponding to the boundary between the skin and the non-skin is occupying in the learning data is low as compared with the skin-like skin or the clearly non-skin region. In a case where the inferred human skin region information is used to correct the color tone of the human skin in the image, the insufficient detection performance of the boundary region as described above is a problem. If an eye or hair is erroneously detected as a skin region, the eye or hair also becomes a target region of the color tone correction calculation, and the original skin region may be corrected to a wrong color. This problem becomes more serious when the proportion of the boundary region occupied in the image is larger than that of the non-boundary region such as when the region of the face is small.

In addition, in an object detection task of detecting a center point of a human face in an image, not only the center of the human face but also a peripheral region thereof may be erroneously detected with a high score. In a case where the center position of the human face is used for organ point detection of a face, or the like, if the detection result spreads to a region larger than the correct definition region as described above, an error is caused in the estimation of the center position, which affects the face organ point detection in the subsequent stage.

Therefore, in the recognition task, it is important to improve the detection performance in the boundary region between the correct definition region and the incorrect definition region. The method disclosed in Japanese Patent No. 6872502 or Yin, H. (2021) "Improved semantic segmentation method using edge features for winter wheat spatial distribution extraction from Gaofen-2 images" is a method for improving the detection performance of the boundary region in the region detection task. However, a dedicated neural network that extracts edge information of an original image is necessary, and there is a problem that the amount of model parameters of the neural network increases.

SUMMARY OF THE INVENTION

The present invention provides a technique for improving the detection performance of a boundary region in an image with fewer processing sources.

According to the first aspect of the present disclosure, there is provided an image processing apparatus comprising: a calculation unit configured to perform an error calculation to obtain an error between a calculation result of a learning model to which a learning image is input and a teacher image corresponding to the learning image; and a learning unit configured to perform learning of the learning model based on the error; wherein the calculation unit performs the error calculation by making an error corresponding to a boundary region of an object in the teacher image larger than other regions.

According to the second aspect of the present disclosure, there is provided an image processing apparatus comprising: an input unit configured to input an image; and a detection unit configured to detect an object from the input image by using a parameter of a learning model learned by making an error corresponding to a boundary region of the object included in the image larger than other regions.

According to the third aspect of the present disclosure, there is provided an image processing method performed by an image processing apparatus, comprising: performing an error calculation to obtain an error between a calculation result of a learning model to which a learning image is input and a teacher image corresponding to the learning image; performing learning of the learning model based on the error, and performing, in the calculation, the error calculation by making an error corresponding to a boundary region of an object in the teacher image larger than other regions.

According to the fourth aspect of the present disclosure, there is provided an image processing method comprising: inputting an image; and detecting the object from the input image using a parameter of a learning model learned by making an error corresponding to a boundary region of an object included in the image larger than other regions.

According to the fifth aspect of the present disclosure, there is provided a non-transitory computer-readable storage medium storing a computer program for causing a computer to function as: a calculation unit configured to perform an error calculation to obtain an error between a calculation result of a learning model to which a learning image is input and a teacher image corresponding to the learning image; and a learning unit configured to perform learning of the learning model based on the error; wherein the calculation unit performs the error calculation by making an error corresponding to a boundary region of an object in the teacher image larger than other regions.

According to the sixth aspect of the present disclosure, there is provided a non-transitory computer-readable storage medium storing a computer program for causing a computer to function as: an input unit configured to input an image; and a detection unit configured to detect an object from the input image by using a parameter of a learning model learned by making an error corresponding to a boundary region of the object included in the image larger than other regions.

Further features of the present invention will become apparent from the following description of exemplary embodiments with reference to the attached drawings.

DESCRIPTION OF THE EMBODIMENTS

Figure 1:
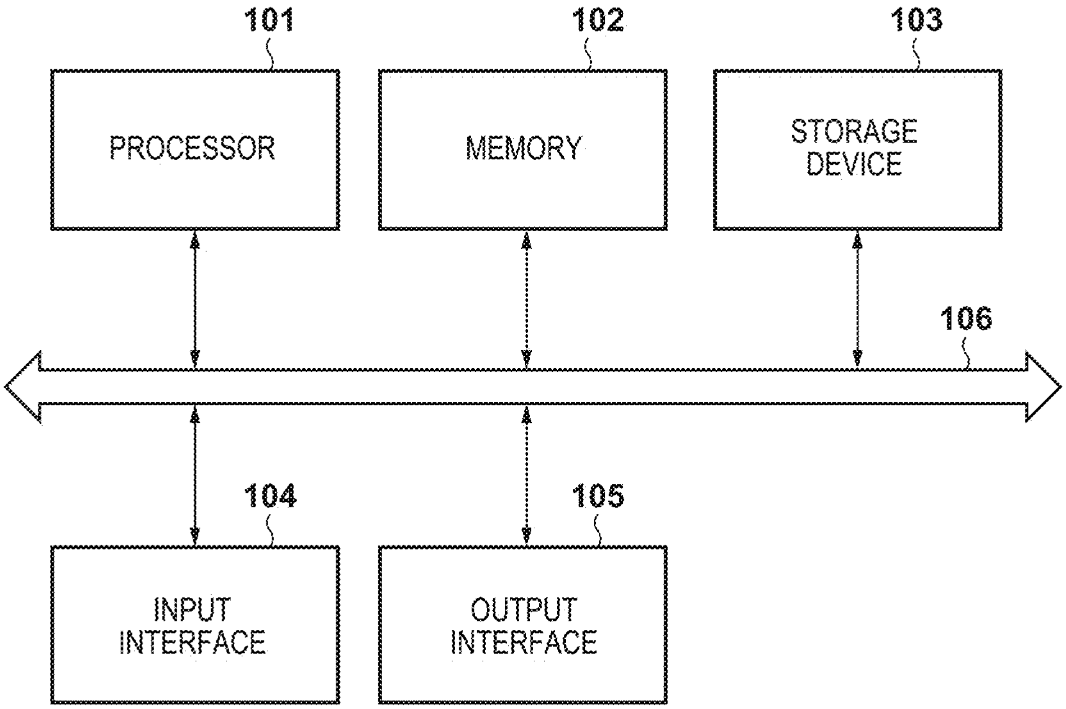
FIG. 1 is a block diagram illustrating a hardware configuration example of a computer device applicable to an image processing apparatus 200.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An image processing apparatus according to the present embodiment performs error calculation for obtaining an error (difference) between a calculation result of a learning model to which a learning image is input and a teacher image corresponding to the learning image, and performs learning of a learning model based on the error. At that time, the image processing apparatus according to the present embodiment performs error calculation by emphasizing an error corresponding to a boundary region in the teacher image.

Figure 2:
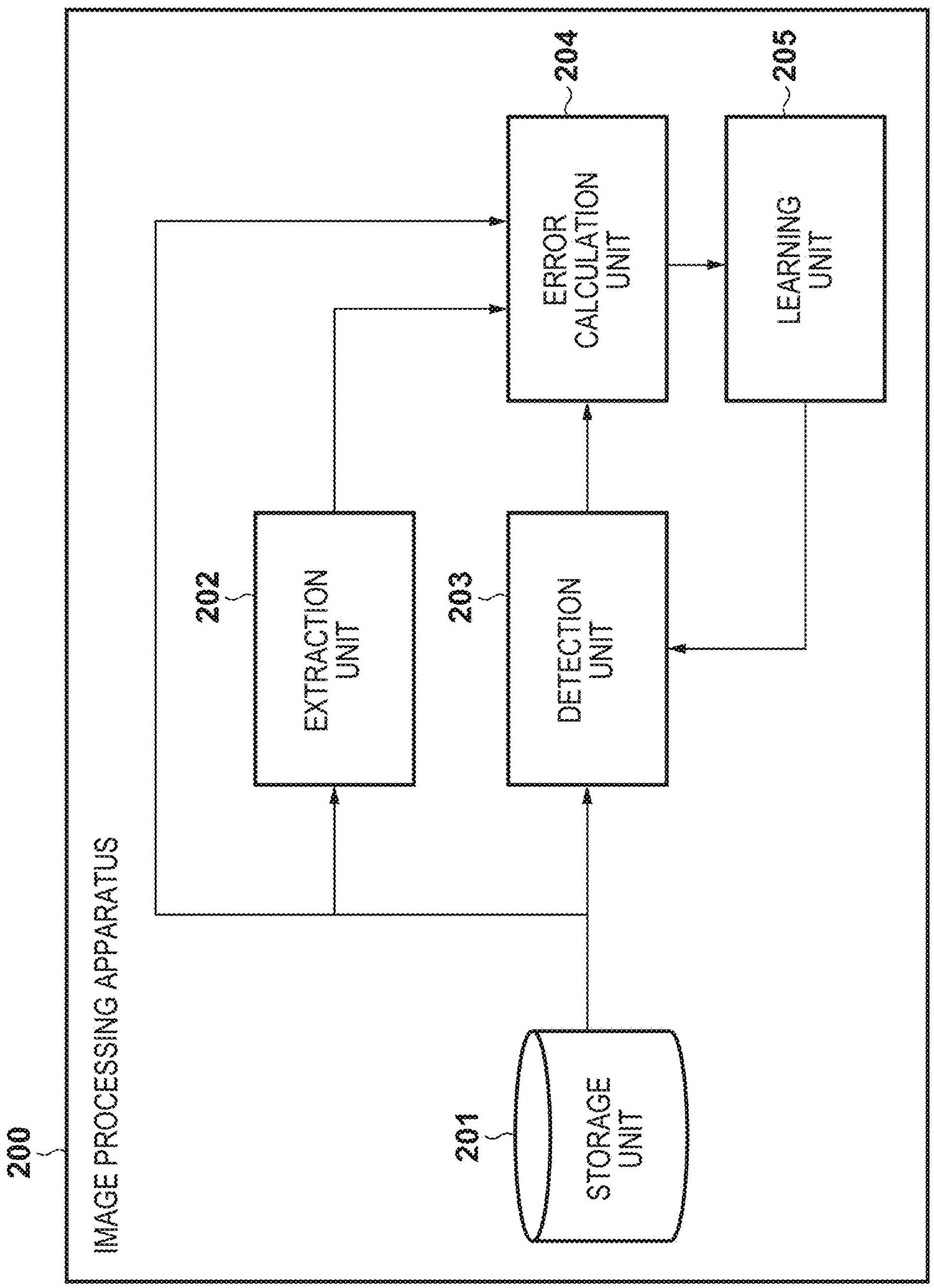
FIG. 2 is a block diagram illustrating a functional configuration example of the image processing apparatus 200.

A functional configuration example of the image processing apparatus 200 according to the present embodiment is illustrated in the block diagram of FIG. 2. In the present embodiment, process in which the image processing apparatus 200 performs learning for executing the human skin region detection task will be described. The human skin region detection task is a task of detecting a skin region of a human (human skin region) from an input image. The human skin region detection task is a task aimed to output "1" for pixels belonging to the human skin region in the input image, and output "0" for pixels belonging to a region other than the human skin region (non-human skin region) in the input image. The process performed by the image processing apparatus 200 to perform learning for executing the human skin region detection task will be described according to the flowchart of FIG. 4.

In step S401, the detection unit 203 acquires the learning image including the human skin region and the teacher image (correct image) corresponding to the learning image from the storage unit 201. When the pixel position L (x, y) in the learning image belongs to the human skin region, the pixel value at the pixel position T (x, y) in the teacher image corresponding to the learning image is "1". When the pixel position L (x, y) in the learning image belongs to the non-human skin region, the pixel value at the pixel position T (x, y) in the teacher image corresponding to the learning image is "0". That is, the teacher image is a map in which label "1" is assigned to the pixel corresponding to the human skin region and the label "0" is assigned to the pixel corresponding to the non-human skin region.

Then, the detection unit 203 inputs the learning image acquired from the storage unit 201 to a learning model which is a "recognition model for recognizing a target from an input image" and performs arithmetic processing of the learning model, thereby acquiring an estimation result (detection result) of the human skin region in the learning image. Although various models can be applied to the learning model, in the present embodiment, a case will be described in which a neural network such as a deep convolutional neural network (DCNN) is used as the learning model. The DCNN is, for example, a neural network that repeats a convolution layer and a pooling layer to gradually gather local features of an input image, and performs a task by obtaining information robust with respect to deformation and positional deviation.

Figure 3B:
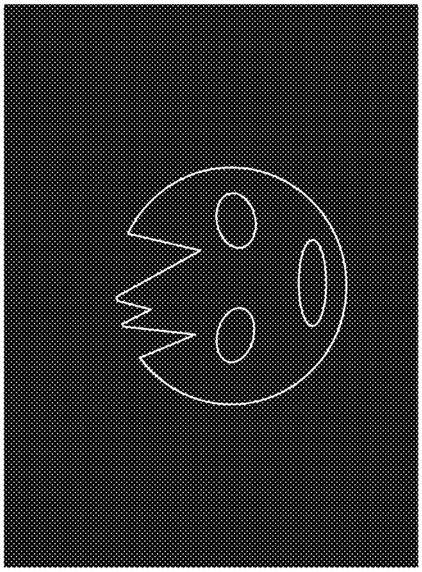
FIG. 3B is a diagram illustrating an extraction result of a boundary region.
Figure 3A:
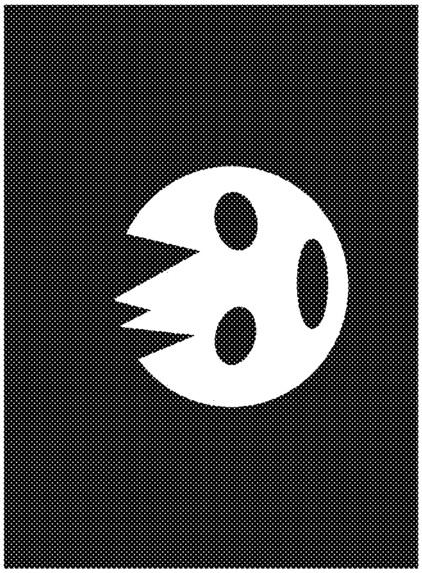
FIG. 3A is a diagram illustrating an example of a teacher image.

In step S402, the extraction unit 202 extracts a boundary (i.e., a boundary line between regions having different assigned labels) between the human skin region and the non-human skin region as a boundary region from the teacher image acquired from the storage unit 201. An example of the teacher image is illustrated in FIG. 3A. In FIG. 3A, a white region indicates a human skin region, and a black region indicates a non-human skin region. FIG. 3B illustrates an extraction result of the boundary region from the teacher image in FIG. 3A. In FIG. 3B, the white region indicates the boundary region, and the black region indicates a region (non-boundary region) other than the boundary region. That is, the extraction unit 202 extracts an edge of the human skin region (white region)/the non-human skin region (black region) in the teacher image as the boundary region. As illustrated in FIG. 3A, in order to extract an edge of a binarized teacher image, a known edge detection method such as a Canny method, a Laplacian method, a Roberts method, a Prewitt method, or a Sobel method may be used. Hereinafter, a set of pixels belonging to the boundary region in the teacher image is assumed as B.

In step S403, the error calculation unit 204 performs an error calculation for obtaining a difference between the teacher image acquired in step S401 and the detection result acquired in step S401 as an error, but at this time, the error calculation is performed by emphasizing an error corresponding to a boundary region in the teacher image (making the error larger than other regions). As the error function used for the error calculation, there are various error functions such as a sum of squares error and a cross entropy error, and a desirable error function may be selected according to the characteristics of the task. For example, when a mean square error is used for the error function, the error calculation unit 204 performs error calculation according to the following Formulas (1) and (2).

$$E(y, y') = \frac{1}{n}\sum_{i=1}^{n} w_i * (y_i - y_i')^2 \tag{1}$$

$$w_i = \begin{cases} 1.0 & (\text{if } p_i \notin B), \\ w & (\text{if } p_i \in B) \end{cases} \tag{2}$$

Here, E(y, y') is an error (difference) between the teacher image y and the detection result y'. In addition, n is the total number of pixels in the teacher image/detection result, wi is the weight corresponding to the i-th pixel in the teacher image/detection result, yi is the pixel value of the i-th pixel in the teacher image, and yi' is the pixel value of the i-th pixel in the detection result.

Here, as shown in Formula (2), the weight wi is preset to have a value "1" in a case where the i-th pixel pi in the teacher image does not belong to the set B, and to have a value "w" (>1) in a case where the pixel pi belongs to the set B. Note that the value of the weight wi described here is an example, and may be set to have the value W1 (>0) in a case where the pixel pi does not belong to the set B, and to have the value W2 (>W1) in a case where the pixel pi belongs to the set B.

That is, the error calculation unit 204 obtains, as an error between the detection result and the teacher image, a sum obtained by weighting the error for each pixel between the detection result and the teacher image. At that time, the weight for the error between the pixel belonging to the boundary region in the teacher image and the corresponding pixel in the detection result is larger than the weight for the error between the pixel not belonging to the boundary region in the teacher image and the corresponding pixel in the detection result. Note that, in the above description, an example of using the mean square error for the error function has been described, but the same applies to a case in which an error function other than the mean square error is used.

In step S404, the learning unit 205 performs a learning process of the learning model by updating parameters of the learning model so that the error obtained in step S403 becomes smaller. In the present embodiment, since the DCNN is used as the learning model, in this case, the learning unit 205 performs the learning process of the DCNN by updating the weight of the DCNN so that the error obtained in step S403 becomes smaller. For example, it is conceivable that the learning unit 205 uses an optimization method such as gradient descent method (SGD) or Adam and updates the weight of the DCNN so as to minimize the error according to a hyperparameter such as a learning rate defined in advance.

In the present embodiment, since the error function is designed so that the penalty at the time of the prediction error of the boundary region increases in step S403, the learning model is updated so as to more strongly correct the prediction error of the boundary region. As a result, learning of the learning model is performed so that the detection performance of the boundary region, that is, the contour of the eye or mouth or the hairline is improved.

In step S405, the learning unit 205 determines whether or not the termination condition of learning is satisfied. Various conditions can be applied to the termination condition of learning, and the termination condition is not limited to a specific condition. As the termination condition of learning, for example, "the error is less than the threshold value", "the difference between the previous error and the current error is less than the threshold value", "the number of repetitions of learning (processes of steps S401 to S404) is greater than or equal to the threshold value", "the elapsed time from the start of learning is greater than or equal to a specified time", or the like can be applied.

Figure 4:
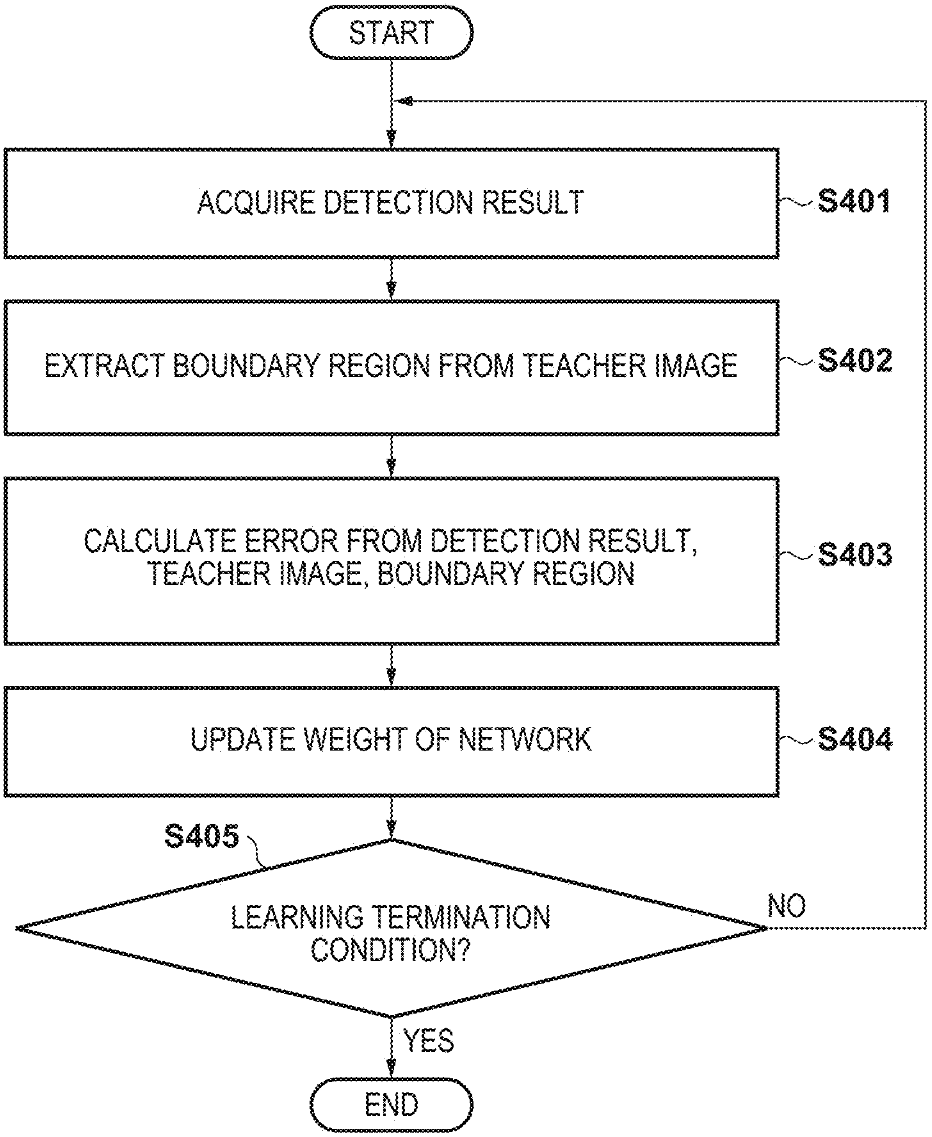
FIG. 4 is a flowchart of a process performed by the image processing apparatus 200 to learn a human skin region detection task.

As a result of such determination, when the termination condition of learning is satisfied, the process according to the flowchart of FIG. 4 is terminated, and when the termination condition of learning is not satisfied, the process proceeds to step S401.

The purpose of learning in the present embodiment is to update the parameters of the learning model to desirable parameters so that the detection result of the detection unit 203 becomes close to the teacher image as much as possible, but at this time, there is a case where the detection performance of the boundary region such as the contour of the eye or the mouth, and the hairline has low quality. In the present embodiment, since the parameters of the learning model are updated so as to more strongly correct the prediction error of the boundary region, the detection performance in the boundary region between the skin and the non-skin can be improved.

Note that, in the present embodiment, the case where the learning of the learning model is performed in units of images has been described, but the present invention is not limited thereto, and for example, learning images may be grouped into several mini-batches and used for learning. In addition, the object is accurately detected from the input image using the parameters of the learning model learned as in the present embodiment. The parameters of the learning model and the program for detecting an object using the parameters are held in a memory on the device, and the CPU executes the detection process using the held data.

Modification Example of First Embodiment

In the first embodiment, the boundary region is extracted from the teacher image, but the extracted boundary region is a region corresponding to an edge between regions of different labels, that is, a boundary line as illustrated in FIG. 3B. In this case, learning of the boundary line portion is enhanced by weighting in the error function, but learning of the peripheral region of the boundary line is not enhanced.

Figure 3C:
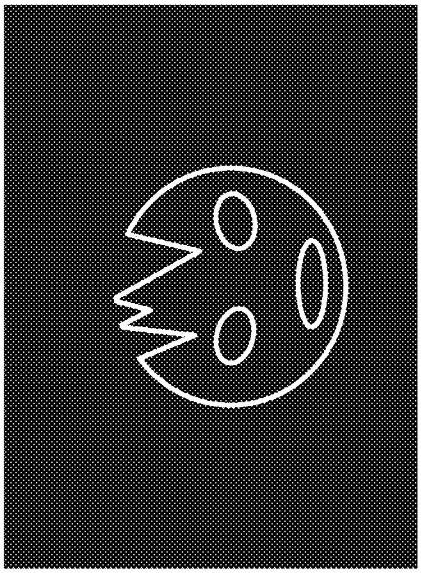
FIG. 3C is a diagram illustrating a boundary line and a peripheral region of the boundary line.

Depending on the purpose of the task, it may be better to learn not only the boundary line but also the peripheral region of the boundary line as illustrated in FIG. 3C. For example, the detection performance of the boundary region between the hair and the skin may be improved by enhancing the learning including the peripheral skin region rather than enhancing the learning of only the contour line. In the present modification example, learning of a peripheral region of a boundary line is enhanced.

In this modification example, the process similar to that of the first embodiment is performed in steps other than step S402 in the flowchart of FIG. 4, but the process described below is performed in step S402.

In step S402, the extraction unit 202 extracts, as a boundary region, a region including a boundary between a human skin region and a non-human skin region and a peripheral region of the boundary from the teacher image acquired from the storage unit 201. Hereinafter, a method using the morphological gradient operation will be described as an example, but the method is not limited thereto.

The morphological gradient operation is a method of extracting a boundary region of a binary image by taking a difference between an expanded image obtained by performing an expansion process on an original binary image and a contracted image obtained by performing a contraction process. At this time, the thickness of the obtained boundary line can be controlled by changing the strength of expansion and contraction. Accordingly, a boundary region including a boundary line between regions having different labels and a peripheral region of the boundary line can be extracted from the teacher image. In FIG. 3C, the white region indicates the boundary region, and the black region indicates a region other than the boundary region.

When the peripheral region of the boundary is extracted, only the peripheral region inside the boundary may be extracted. The detection performance can be improved for a detection target in which a detection error is likely to occur inside the boundary. This can be extracted by a method such as taking a difference between the original binary image and the contracted image. Alternatively, only the peripheral region outside the boundary may be extracted. The detection performance can be improved for a detection target in which a detection error is likely to occur inside the boundary. This can be extracted by a method such as taking a difference between the expanded image and the original image.

In addition, the widths of the boundary regions may be gradually increased by repeating the processes of steps S401 to S405, starting from a state in which the boundary regions are thinly extracted. The thickness in that case may be changed according to a rule determined in advance, or may be dynamically changed according to the magnitude of the error obtained in step S403. As a detection result, the thickness is increased to a position where the detection performance exceeds a predetermined threshold.

Second Embodiment

In each of the following embodiments including the present embodiment, only the difference from the first embodiment will be described, assuming that they are similar to the first embodiment unless otherwise stated. In the first embodiment, as shown in Formula (2), uniform values are set for the weight for the boundary region and the weight for the non-boundary region. However, there is a case where it is desirable to determine the weight according to the area ratio (pixel number ratio) between the boundary region and the non-boundary region.

Figure 5:
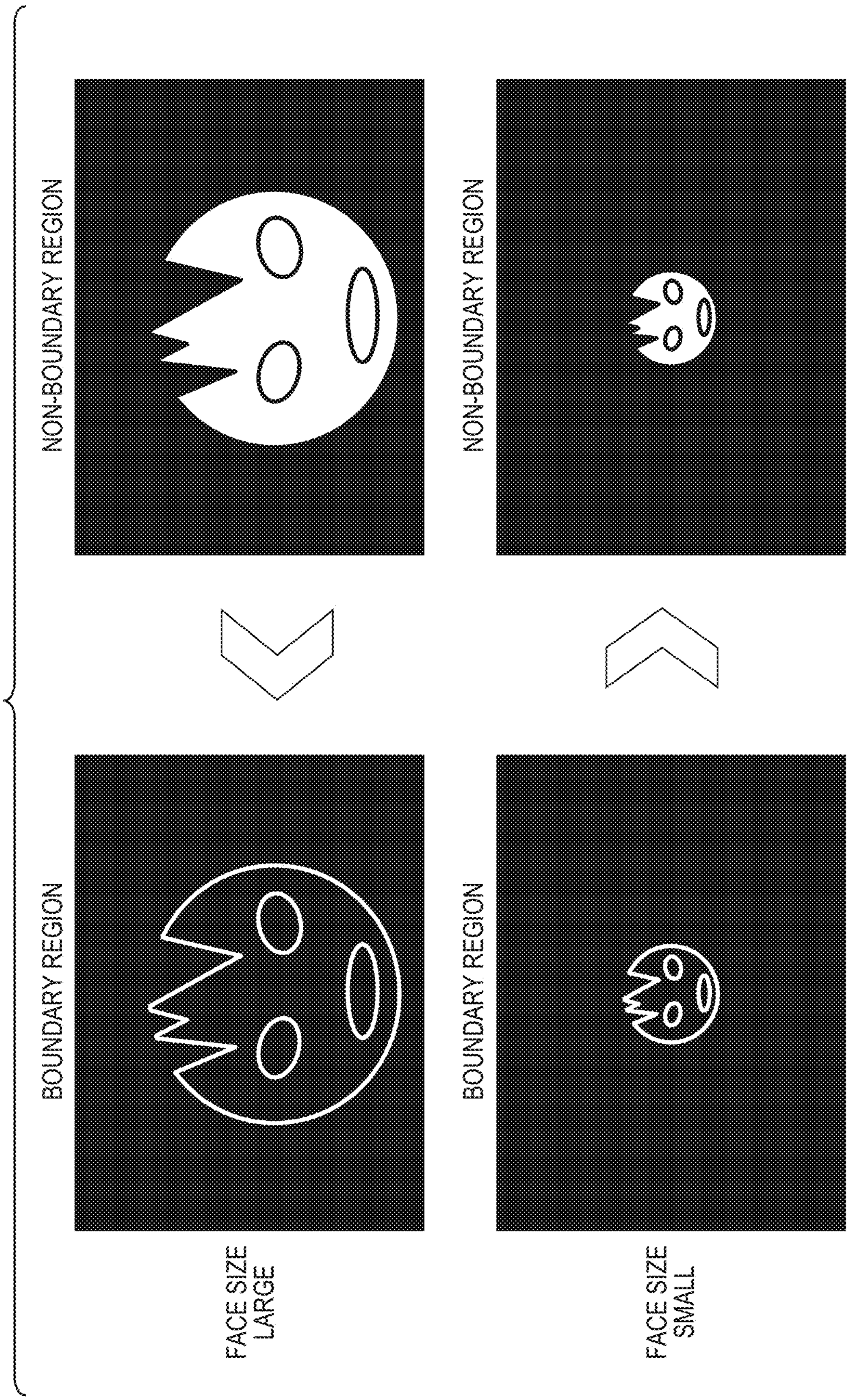
FIG. 5 is a diagram illustrating a ratio of areas (number of pixels) of a boundary region and a non-boundary region in a case where a face size in an image is large (upper stage) and in a case where the face size is small (lower stage).

An example is illustrated in FIG. 5. FIG. 5 is a diagram illustrating a ratio of areas (number of pixels) of a boundary region and a non-boundary region in a case where a face size in an image is large (upper stage) and in a case where the face size is small (lower stage). As illustrated in the upper stage of FIG. 5, when the face size is large, the area occupied by the boundary region is small with respect to the area occupied by the non-boundary region, but as illustrated in the lower stage of FIG. 5, when the face size is small, the area occupied by the boundary region is larger than the area of the non-boundary region. In this case, it is possible to uniformly align the learning balance of the entire learning data by setting the weight for the boundary region according to the area ratio between the boundary region and the non-boundary region in the image rather than uniformly setting the weight with respect to all the images.

In this modification example, the process similar to that of the first embodiment is performed in steps other than step S403 in the flowchart of FIG. 4, but the process described below is performed in step S403. In step S403, the error calculation unit 204 sets the weight wi according to the following Formula (3) instead of Formula (2).

$$w_i = \begin{cases} 1.0 \ (\text{if } p_i \notin B), \\ w * \dfrac{S2}{S1} \ (\text{if } p_i \in B) \end{cases} \tag{3}$$

Here, S1 represents the area of the boundary region, and S2 represents the area of the non-boundary region. In a case where the i-th pixel pi in the teacher image does not belong to the set B, the error calculation unit 204 sets a value "1" to the weight wi. Furthermore, in a case where the pixel pi belongs to the set B, the error calculation unit 204 sets, as the weight wi, a value obtained by multiplying the value "w" (>1) by the area ratio between the boundary region and the non-boundary region. That is, when the area of the boundary region is larger than the area of the non-boundary region, a value smaller than the value "w" is set as the weight wi, and when the area of the boundary region is smaller than the area of the non-boundary region, a value larger than the value "w" is set as the weight wi. Therefore, the entire error can be set so that the error of the boundary region is not buried in the error of the non-boundary region. In addition, in a case where the area of the boundary region is large, wi is set to be small, and thus, it is possible to suppress that the error of the boundary region becomes excessive and learning of the non-boundary region does not proceed. Note that, in the above description, an example of using the mean square error for the error function has been described, but the same applies to a case in which an error function other than the mean square error is used. In this manner, the balance of learning of the entire learning data can be equalized by determining the weight of the error for the boundary region according to the area ratio between the boundary region and the non-boundary region.

Third Embodiment

In the first embodiment and the second embodiment, the configuration in which the boundary region in the teacher image is utilized in the region detection task has been described. In the present embodiment, a configuration for utilizing a boundary region in an object detection task will be described.

Figure 6A:
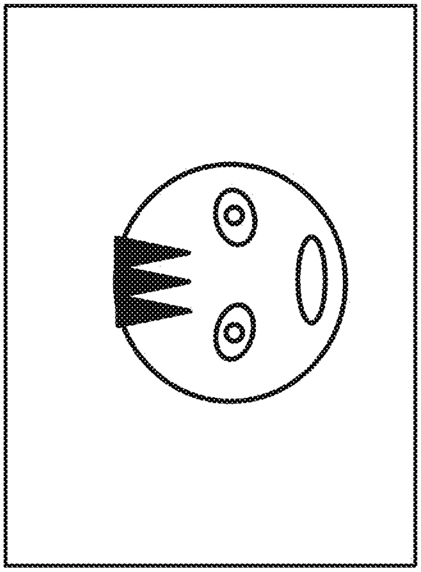
FIG. 6A is a diagram illustrating an example of a learning image.

In the present embodiment, an example of improving learning performance in the human face detection task will be described. The human face detection task aims to detect a center point of a face of a human in an input image. At this time, FIG. 6A illustrates an example of a learning image stored in the storage unit 201, and FIG. 6B illustrates an example of a teacher image (correct image) corresponding to the learning image.

Figure 6B:
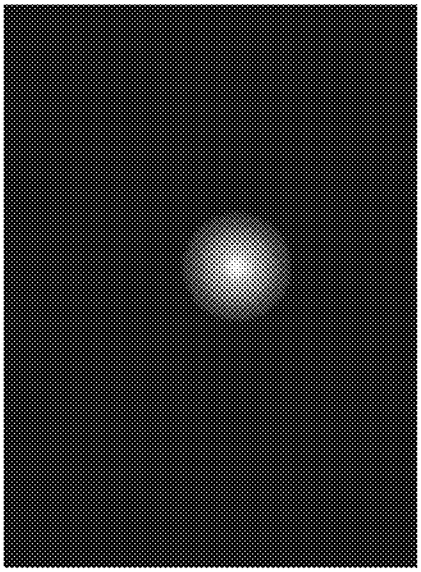
FIG. 6B is a diagram illustrating an example of a teacher image (correct image).

FIG. 6B is configured such that the center point of the region of the face of the human in the teacher image is white, and the region of the face becomes blacker the farther away from the center point. Actually, the pixel displayed in white is a pixel having a pixel value "1", and the pixel displayed in black is a pixel having a pixel value "0". Furthermore, the pixel value of the pixel displayed whiter is closer to "1", and the pixel value of the pixel displayed blacker is closer to "0".

Figure 6C:
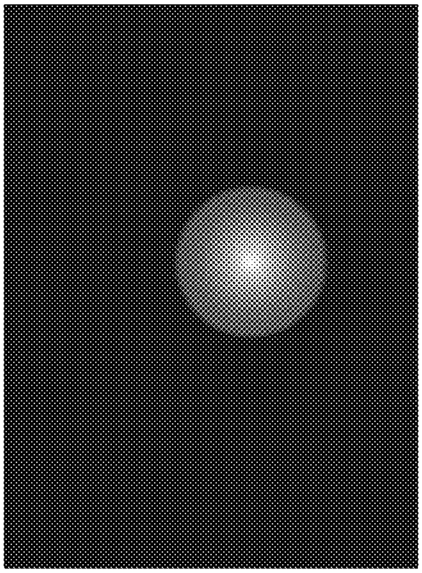
FIG. 6C is a diagram explaining a case where learning is performed so that a correct definition region in the detection result appears to be more spread than the correct definition region defined by the teacher image.
Figure 6D:
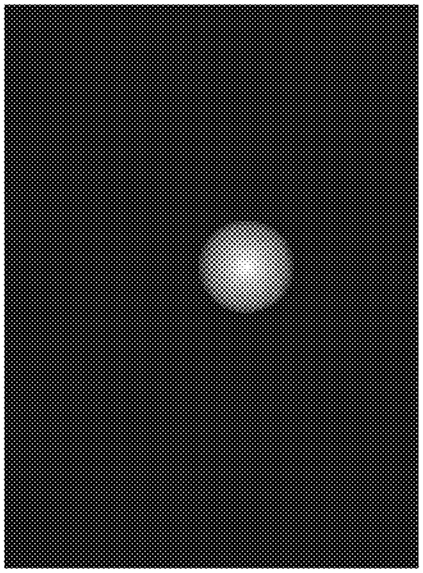
FIG. 6D is a diagram explaining a case where learning is performed so that peak values appear over a wide range.

Here, the purpose of learning in the present embodiment is to update the parameters of the learning model to desired parameters so that the detection result of the detection unit 203 becomes closer to the teacher image as much as possible. However, at this time, the periphery of the boundary between the correct definition region (non-black region) and the incorrect definition region (black region) may not be correctly learned. For example, there is a case where learning is performed so that the correct definition region in the detection result appears wider than the correct definition region defined by the teacher image as illustrated in FIG. 6C. Alternatively, as illustrated in FIG. 6D, there is a case where learning is performed so that the peak value appears in a wide range even if the spread of the correct definition region in the detection result is equivalent to the correct definition region in the teacher image. If the correct definition region spreads to a large region as described above, an error may occur in the estimation of the center position. In particular, in a case where a plurality of humans are shown in one image and the distance between the faces is short, there is a possibility that the face detection results of the plurality of humans are connected, making it more difficult to estimate the center position. Therefore, an object of the present embodiment is to improve detection performance of a boundary region between a correct definition region and an incorrect definition region in an object detection task.

Figure 7:
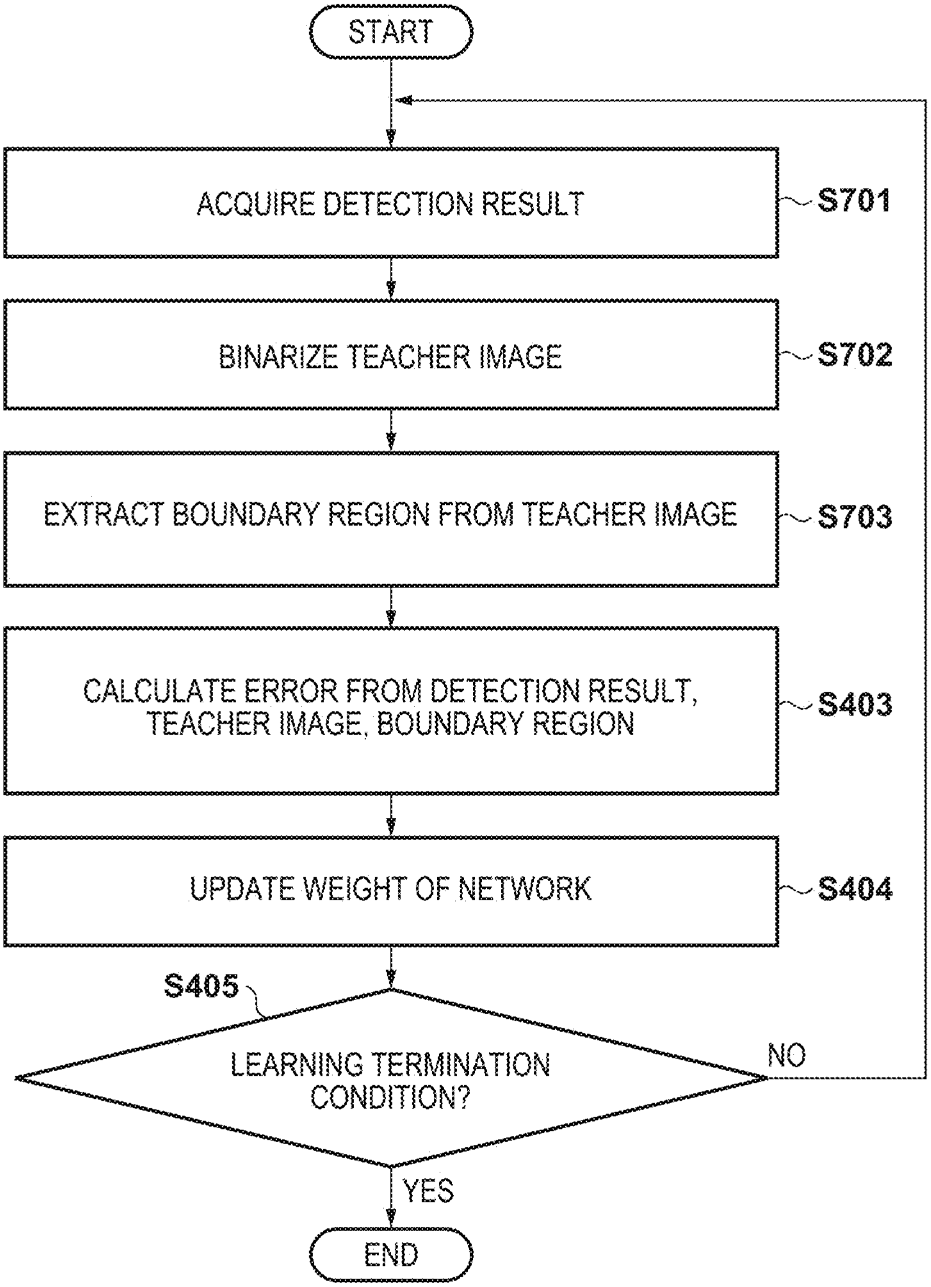
FIG. 7 is a flowchart of a process performed by the image processing apparatus 200 to learn an object detection task.

A process performed by the image processing apparatus 200 to learn an object detection task will be described with reference to the flowchart of FIG. 7. In FIG. 7, process steps similar to process steps depicted in FIG. 4 are denoted with the same step numbers, and descriptions of such process steps will be omitted.

In step S701, the detection unit 203 acquires the learning image including the region of the face of the human and the teacher image (correct image) corresponding to the learning image from the storage unit 201. Then, the detection unit 203 inputs the learning image acquired from the storage unit 201 to a learning model which is a "recognition model for recognizing a target from an input image" and performs arithmetic processing of the learning model, thereby acquiring an estimation result (detection result) of the region of the face of the human in the learning image.

Figure 8B:
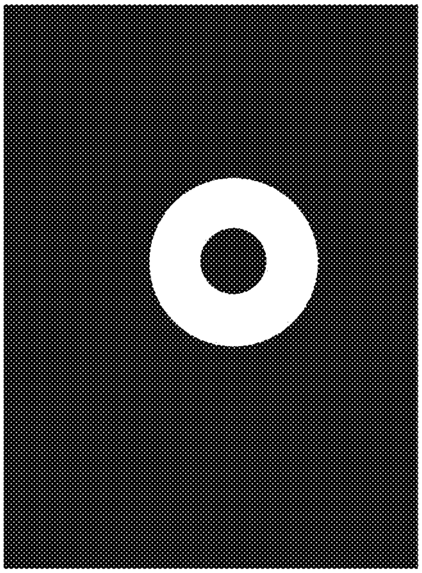
FIG. 8B is a diagram illustrating a boundary region.
Figure 8A:
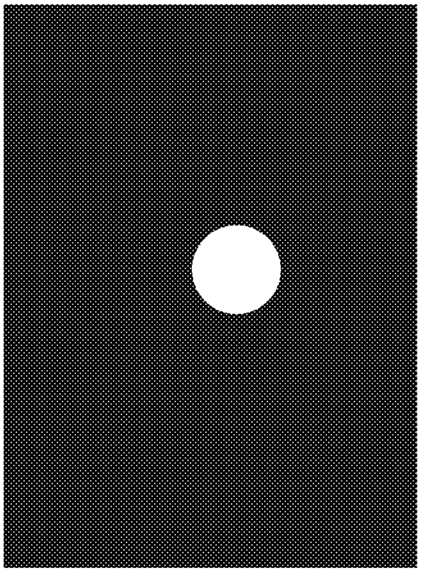
FIG. 8A is a diagram illustrating a result of binarizing a teacher image.

In step S702, the extraction unit 202 binarizes the teacher image. The threshold value for binarization may be freely determined according to the purpose of learning. In the present embodiment, the following description will be made assuming the threshold is 0. FIG. 8A illustrates a result of binarizing the teacher image in FIG. 6B with the threshold set to 0.

In step S703, the extraction unit 202 extracts, as a boundary region, a boundary between a region having a pixel value of "0" and a region having a pixel value of "1" from the teacher image (binarized teacher image) binarized in step S702. For example, similarly to the second embodiment, when the boundary region is extracted using the morphological gradient operation, the boundary region (white region) illustrated in FIG. 8B can be acquired by taking a difference between the expanded image obtained by performing the expansion process on the binarized teacher image in FIG. 8A and the contracted image obtained by performing the contraction process on the binarized teacher image in FIG. 8A.

As described in the second embodiment, the thickness and radius of the obtained boundary region can be controlled by changing the strength of expansion and contraction. For example, in a case where the detection result tends to be excessively wider than the correct definition region of the teacher image as illustrated in FIG. 6C, the strength of expansion may be increased, and the boundary region outside the correct definition region may be extracted to be thicker. In addition, in a case where the peak value of detection is over a wide range as illustrated in FIG. 6D, the strength of contraction may be increased, and the boundary region inside the correct definition region may be extracted to be thicker. Both of the above may be combined. The method for extracting the boundary region is not limited to the morphological gradient operation.

Since the learning of the boundary region extracted in step S703 is enhanced more than the other regions due to the weighting of the error (difference), it is possible to suppress the spread of the detection result or the spread of the detection peak value.

As described above, according to the present embodiment, it is possible to improve the boundary region detection performance of the object detection task by binarizing the teacher image, extracting the boundary region, and weighting the error (difference) of the boundary region.

Note that, in the first to third embodiments, only an example of a configuration has been described in which, when error calculation for obtaining an error between a calculation result of a learning model to which a learning image is input and a teacher image corresponding to the learning image is performed, the error calculation is performed by emphasizing the error corresponding to the boundary region in the teacher image. That is, the calculation formula and the parameters for the error calculation are not limited to a specific format as long as the same effect can bate obtained.

Fourth Embodiment

The functional units of the image processing apparatus 200 illustrated in FIG. 2 other than the storage unit 201 may be implemented by hardware or software (computer program). In the latter case, the computer device that can execute the software is applicable to the image processing apparatus 200. A hardware configuration example of a computer device applicable to the image processing apparatus 200 will be described with reference to a block diagram of FIG. 1. Note that the hardware configuration illustrated in FIG. 1 is an example of a hardware configuration of a computer device applicable to the image processing apparatus 200, and can be appropriately modified/changed.

The processor 101 is a processor such as a CPU or an MPU, and executes various processes using a computer program or data stored in the memory 102. As a result, the processor 101 controls the operation of the entire image processing apparatus 200, and executes or controls various types of processes described as processes executed by the image processing apparatus 200.

The memory 102 has an area for storing a computer program and data loaded from the storage device 103 and an area for storing information (computer program and data)

acquired from the outside via the input interface 104. Furthermore, the memory 102 has a work area used when the processor 101 executes various types of processes. In this way, the memory 102 can provide the various areas as appropriate.

The storage device 103 is a large-capacity information storage device such as a hard disk drive device. The storage device 103 saves an operating system (OS), computer programs and data for causing the processor 101 to execute or control various types of processes described as processes executed by the image processing apparatus 200, and the like. Computer programs and data saved in the storage device 103 are appropriately loaded into the memory 102 under the control of the processor 101.

Note that the storage device 103 may include a recording medium such as a CD-ROM or a DVD-ROM, and a drive device that reads and writes information from and to the recording medium. Furthermore, the storage device 103 may be a memory device attachable to and detachable from an image processing apparatus such as a USB. The storage unit 201 in FIG. 2 can be implemented using the storage device 103 or the memory 102.

The input interface 104 may include various interfaces for inputting information to the image processing apparatus 200. For example, the input interface 104 is an interface for receiving information transmitted from an external device. Furthermore, for example, the input interface 104 is an interface for receiving an instruction or information input by the user operating an operation unit (keyboard, mouse, touch panel screen, etc.).

The output interface 105 may include various interfaces for outputting information from the image processing apparatus 200. For example, the output interface 105 is an interface for transmitting information to an external device via a network such as a LAN or the Internet. The processor 101, the memory 102, the storage device 103, the input interface 104, and the output interface 105 are all connected to the system bus 106.

The numerical values, processing timings, processing orders, processing entities, and data (information) acquiring method/transmission destination/transmission source/storage location, and the like that are used in each of the embodiments described above are referred to by way of an example for specific description, and are not intended to be limited to these examples.

Alternatively, some or all of the embodiments described above may be used in combination as appropriate. Alternatively, some or all of the embodiments described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-151542, filed Sep. 19, 2023, which is hereby incorporated by reference herein in its entirety.

What is claimed is:

1. An image processing apparatus comprising:

at least one processor; and at least one memory coupled to the at least one processor, the at least one memory having instructions stored thereon, that when executed by the at least one processor, cause the at least one processor to:

perform an error calculation to obtain an error between a calculation result of a learning model to which a learning image is input and a teacher image corresponding to the learning image;

obtain a sum in which an error for each pixel between the calculation result and the teacher image is weighted as an error between the calculation result and the teacher image, a weight for an error between a pixel belonging to the boundary region in the teacher image and a corresponding pixel in the calculation result being larger than a weight for an error between a pixel not belonging to the boundary region in the teacher image and a corresponding pixel in the calculation result;

set a value corresponding to an area ratio between a boundary region and a non-boundary region in the teacher image as a weight for an error between a pixel belonging to the boundary region in the teacher image and a corresponding pixel in the calculation result; and perform learning of the learning model based on the error, wherein the error calculation is performed by making an error corresponding to a boundary region of an object in the teacher image larger than other regions.

2. The image processing apparatus according to claim 1, wherein the at least one processor is further configured to learn the learning model by updating a parameter of the learning model so as to further reduce an error between the calculation result and the teacher image.

3. The image processing apparatus according to claim 1, wherein the boundary region in the teacher image is a region of a boundary line between regions having different assigned labels.

4. The image processing apparatus according to claim 1, wherein the boundary region in the teacher image is a region including a boundary line between regions having different assigned labels and a peripheral region of the boundary line.

5. The image processing apparatus according to claim 1, wherein the at least one processor is further configured to dynamically change a width of the boundary region.

6. The image processing apparatus according to claim 1, wherein the at least one processor is further configured to perform the error calculation by emphasizing an error corresponding to a boundary region in a binarized teacher image obtained by binarizing the teacher image.

7. An image processing method performed by an image processing apparatus, comprising:

performing an error calculation to obtain an error between a calculation result of a learning model to which a learning image is input and a teacher image corresponding to the learning image;

performing learning of the learning model based on the error;

performing, in the calculation, the error calculation by making an error corresponding to a boundary region of an object in the teacher image larger than other regions;

obtaining a sum in which an error for each pixel between the calculation result and the teacher image is weighted as an error between the calculation result and the teacher image, a weight for an error between a pixel belonging to the boundary region in the teacher image and a corresponding pixel in the calculation result being larger than a weight for an error between a pixel not belonging to the boundary region in the teacher image and a corresponding pixel in the calculation result; and setting a value corresponding to an area ratio between a boundary region and a non-boundary region in the teacher image as a weight for an error between a pixel belonging to the boundary region in the teacher image and a corresponding pixel in the calculation result.

8. A non-transitory computer-readable storage medium storing a computer program for causing a computer to:

perform an error calculation to obtain an error between a calculation result of a learning model to which a learning image is input and a teacher image corresponding to the learning image;

obtain a sum in which an error for each pixel between the calculation result and the teacher image is weighted as an error between the calculation result and the teacher image, a weight for an error between a pixel belonging to the boundary region in the teacher image and a corresponding pixel in the calculation result being larger than a weight for an error between a pixel not belonging to the boundary region in the teacher image and a corresponding pixel in the calculation result;

set a value corresponding to an area ratio between a boundary region and a non-boundary region in the teacher image as a weight for an error between a pixel belonging to the boundary region in the teacher image and a corresponding pixel in the calculation result; and perform learning of the learning model based on the error, wherein the error calculation is performed by making an error corresponding to a boundary region of an object in the teacher image larger than other regions.

* * * * *